UNITED STATES PATENT OFFICE.

WILLIAM MORLEY MARTIN, OF REDRUTH, ENGLAND.

PROCESS FOR THE SEPARATION OF COMPLEX ORES.

1,066,828. Specification of Letters Patent. Patented July 8, 1913.

No Drawing. Application filed February 23, 1910. Serial No. 545,520.

*To all whom it may concern:*

Be it known that I, WILLIAM MORLEY MARTIN, a subject of the King of Great Britain, residing at Fore street, Redruth, in the county of Cornwall, England, analytical chemist, have invented a certain new and useful Improved Process for the Separation of Complex Ores, of which the following is a specification.

There are many complex ores in which the minerals are so combined or intimately associated that economical separation of the minerals has been practically impossible, or where partial separation has been effected with economy the separated material has still consisted of mixtures of a value considerably less than that indicated by analysis. Particular examples of such ores are those containing sulfids of lead and zinc and other complex sulfids, and, as an instance of a somewhat different class of ore, the wolfram-tin ores, many tin and copper ores and arsenical ores generally. Two prime difficulties present themselves in the treatment of these ores. In the first place many of the ores are not amenable to separation of their valuable constituents from the gangue by the simple washing processes which succeed with less troublesome ores, while in many cases even though this difficulty is not experienced, or is overcome by other processes of concentration, there remains the difficulty of separating the closely associated valuable constituents in the concentrates, as for instance, the sulfids of lead and zinc, which notwithstanding differences of specific gravity that suffice in ordinary cases to furnish a basis for separation, cannot be sufficiently parted to afford products profitable for smelting. The other prime difficulty to which I refer is the loss experienced in treating most complex ores of the kind in question, owing to the particles of crushed ore floating away with the water in any wet method of concentration.

I have made a discovery with regard to such complex ores. It is that many of them can be more profitably treated by a water concentration, in the sense that a better separation of their constituent minerals is attained and the amount of floating mineral is minimized, if the subdivided ore or a concentrate of the ore is first mixed with a solution of an oxidizing agent of a kind which is adapted partially to oxidize the ore at a raised temperature, and then heating the mass.

Ores have of course frequently been treated with oxidizing agents for various purposes, but whenever such treatment has been applied with a view to aiding separation of constituents of the ore by water concentration, the treatment has had for its object the oxidation of one or more of the constituents so as to convert it or them into a soluble or insoluble oxidized product and thus to vary the relationship of this constituent or these constituents to the concentration process by the conversion into the oxidized product.

Now my treatment with an oxidizing agent may effect some oxidation, but inasmuch as the proportion of oxidizing agent which I use is very small in comparison with the total amount of oxidizable material in the ore, the effect produced in relation to the concentration process is not due to the conversion of one or more constituents into oxidation products in the sense of the older treatment, and the valuable constituents of the ore are recovered by the water concentration in a substantially unaltered condition. In fact, it is clear to me that my treatment succeeds under conditions which exclude any save the very slightest oxidation; for in many instances the amount of oxygen imparted to the ore by the oxidizing agent can be shown to be only a minute fraction of that contained in the amount of oxidizing agent used. I have to admit that at present I am unaware of the cause of the good effect obtained by my treatment.

According to my invention, I mix the suitably subdivided ore, or in some cases a concentrate thereof, with a solution of an oxidizing agent. The proportion of oxidizing agent to be used varies with the nature of the ore or concentrate under treatment. Generally speaking, the smaller the proportion of gangue in an ore, the larger should be the proportion of oxidizing agent. It follows that a concentrate generally receives a more liberal addition than a crude ore. On the other hand, when one of the valuable constituents of the ore is in a very fine state of division, the addition may be smaller than when all the constituents are less finely divided. In any case, the proportion of oxidizing agent is small, seldom exceeding 2 per cent. of the weight of the ore. So far as I am at present aware, the proportion necessary for the best results cannot be ascertained by analysis of the ore or concentrate further than in the rough manner indicated above. It is essential therefore to proceed by trial on samples of the ore to ascertain the best proportion of oxidizing agent.

A nitrate is the best oxidizing agent for the majority of ores. A nitrite is equivalent to a nitrate for the purpose, but is, of course, much more costly. Bichromates and permanganates give good results in some cases, but are generally not so useful as a nitrate.

In order to ascertain the best proportion of nitrate separate portions, each weighing say half a hundredweight, of the ore or concentrate may be moistened with aqueous solutions of nitrate of soda of known strength, and heated in the manner described below. After the heating operation the samples are subjected to a water concentration; that sample which gives the best result indicates the best proportion of nitrate for the ore or concentrate in question. The proportion of water used to dissolve the nitrate must be such that the powdered ore is thoroughly moistened by the solution. Excess of water is not injurious but is obviously uneconomical.

The moistened ore is introduced into any convenient furnace, the only condition to be observed being that when the ore is one the concentration of which is rendered more difficult by an oxidizing roasting, air should be excluded; so too, when the ore is rich in silver, exclusion of air is desirable. In the furnace the ore should attain a temperature of a dull red heat; it need not be maintained at this temperature for longer than a few minutes. After the heating operation the ore or concentrate is crushed, if necessary, and subjected to a water concentration, by which is meant gravitally separating by water, tendency of the particles to float being thereby avoided.

The selection of a nitrate for the process is determined by the question of cost; at present nitrate of soda is most economical; but nitrate of lime might become the better material, particularly as it is of no moment whether nitrite is present, nitrite being the equivalent of nitrate for the purpose of my invention. It is obvious that moistening an ore containing a basic material with a solution of nitric acid is equivalent to moistening the ore with a solution of a nitrate.

I claim—

1. A process of treating complex ores containing sulfids of lead and zinc or concentrates thereof so as to recover the valuable constituents in a separated and substantially unaltered condition, which process consists in mixing the subdivided material with a solution of an oxidizing agent of a kind adapted partially to oxidize the ore at a raised temperature and in proportion insufficient to desulfurize the ore, then heating the mass and finally gravitally separating by water.

2. A process of treating complex ores containing sulfids of lead and zinc or concentrates thereof so as to recover the valuable constituents in a separated and substantially unaltered condition, which process consists in mixing the subdivided material with a solution of a nitrate in proportion insufficient to desulfurize the ore, then heating the mass and finally gravitally separating by water.

3. A process of treating complex ores containing sulfids of lead and zinc or concentrates thereof so as to recover the valuable constituents in a separated and substantially unaltered condition, which process consists in mixing the subdivided material with a solution of nitrate of soda in proportion insufficient to desulfurize the ore, then heating the mass to a temperature not exceeding a dull red heat and finally gravitally separating by water.

In testimony whereof I have signed my name to this specification in the presence of two subscribing witnesses.

WILLIAM MORLEY MARTIN.

Witnesses:
  FREDERICK ANDREWS,
  WILLIAM ARTHUR MACLEAN.

---

Copies of this patent may be obtained for five cents each, by addressing the "Commissioner of Patents, Washington, D. C."